United States Patent
Hassett

(10) Patent No.: US 8,442,589 B2
(45) Date of Patent: May 14, 2013

(54) MEASUREMENT OF LTE CELL ATTACH DELAY

(75) Inventor: Brendan Hassett, Loughrea (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 260 days.

(21) Appl. No.: 13/081,118

(22) Filed: Apr. 6, 2011

(65) Prior Publication Data

US 2012/0184264 A1 Jul. 19, 2012

Related U.S. Application Data

(60) Provisional application No. 61/432,238, filed on Jan. 13, 2011.

(51) Int. Cl.
*H04B 1/38* (2006.01)

(52) U.S. Cl.
USPC .................. 455/561; 455/422.1; 455/435.1; 370/241.1; 370/252

(58) Field of Classification Search .............. 455/561, 455/422.1, 435.1, 67.11, 67.13, 226.1
See application file for complete search history.

(56) References Cited

PUBLICATIONS

3GPP TS 32.331 "Telecommunication management; Notification Log (NL) Integration Reference Point (IRP)" (Mar. 2011) http://www.3gpp.org/ftp/Specs/html-info/32331.htm.
3GPP TS 36.331 "Evolved Universal Terrestrial Radio Access (E-UTRA); Radio Resource Control (RRC); Protocol specification" (Mar. 2011) http://www.3gpp.org/ftp/Specs/html-info/36331.htm

*Primary Examiner* — Temica M Beamer

(57) ABSTRACT

A base station has a wireless interface, a processor, and a management interface. The processor determines a delay before an attach request was successful, the processor also being arranged to determine a cumulative distribution of the delay values of different attach requests, and a compressed representation of the cumulative distribution. The management interface is used to send the compressed representation to a management system. The cumulative distribution is simpler, having no change in a sign of its gradient, and so can be approximated and represented in compressed form with much less risk of loss of relevant information.

21 Claims, 12 Drawing Sheets

FIG 6  Example of cell with bad experience for some users

US 8,442,589 B2

MEASUREMENT OF LTE CELL ATTACH DELAY

CROSS REFERENCE TO RELATED APPLICATIONS

This application claims the benefit of U.S. provisional patent application No. 61/432,238 filed on Jan. 13, 2011, the disclosure of which is fully incorporated herein by reference.

TECHNICAL FIELD

The present invention relates to nodes of cellular wireless networks, to methods of operating such nodes and corresponding computer programs.

BACKGROUND

In an LTE cellular network, the User Equipment (UE), such as a cellular phone or wireless handheld computing device, attaches to a base station of a cell by repeated requests (preambles) on the Random Access Channel until the request is acknowledged. The successful conclusion of this sequence is known as "UE attach".

The number of requests needed per UE attach is an important characteristic of an LTE cell. If this number of requests is high, this indicates lengthy delays in attaching, due to congestion in the cell or a badly-configured cell.

When the User Equipment successfully attaches to the base station (such as an evolution node B, eNodeB or eNB for the LTE examples) of the cell of the network, the UE sends the counter numberOfPreamblesSent to the eNB, to inform the eNB how many attempts had been made before success. This is set out in 3GPP specification 32.331 clause 6.2.2.

To make a decision about the performance of the network, information about each cell must be transferred to a management system. It is not practical to transfer the numberOfPreamblesSent counter for each UE attach. In a large network, there could be several millions of UE attaches per hour.

ABBREVIATIONS

LTE Long-Term Evolution
RACH Random Access Channel
UE User Equipment

REFERENCES

3GPP TS 32.331 "Evolved Universal Terrestrial Radio Access (E-UTRA); Radio Resource Control (RRC); Protocol specification" http://www.3gpp.org/ftp/Specs/html-info/36331.htm

SUMMARY

According to embodiments of the invention, delay characteristics indicating congestion at the cell may be encoded in a compressed form using a reduced number of integers, for sending to the management system. This can reduce bandwidth, processing, and storage load.

According to a first aspect a base station for a cellular wireless network has a wireless interface, a processor, and an interface for communication with a management system, the wireless interface being arranged to receive attach requests from UEs, the processor being coupled to the wireless interface and arranged to determine for each successful attach request a delay value representing a delay before the attach request was successful, the processor also being arranged to determine a cumulative distribution of the delay values of different attach requests, and to generate a compressed representation of the cumulative distribution, and the processor being coupled to the management interface to use the management interface to send the compressed representation to the management system.

The cumulative distribution can be seen as providing a graph whose curve remains monotonic in the sense of having no change in a sign of its gradient, and so alters in a simple way as delays increase or decrease, for a wide variety of changes to the distribution of the delays. Hence, while the distribution of delays can be relatively hard to compress without risking losing valuable information, the shape of the cumulative distribution can be approximated and represented in compressed form with much less risk of loss of relevant information. This can enable the information to use less bandwidth if sent to a management system, or use less storage space if retained for use at the base station.

Any additional features can be added to these aspects, or disclaimed from them, and some are described in more detail below.

In some embodiments the delay values can take the form of retry counts. The retry counts can comprise counts of unsuccessful attach requests.

In some embodiments, the delay values comprise a time interval from starting the attach request until the attach request was successful.

In some embodiments the management interface comprises an Operation And Maintenance (OAM) interface for communication with the management system.

In some embodiments the management system is a central management system and in alternative embodiments the management system is a distributed management system.

In some embodiments, the compressed representation can comprise a subsampled version of the cumulative distribution. Where the subsampled version of the cumulative distribution is an approximation of the original cumulative distribution generated by using sampling of data from the original cumulative distribution.

In some embodiments, the compressed representation can comprise a mean value and a variance value. In some cases this can be enough to provide a good approximation, and it can be tested to see if another representation such as a subsampled version of the cumulative distribution is needed.

In some embodiments the processor has a number of counters each operable to accumulate a count of instances of different ones of the possible delay values to obtain a distribution of the delay values. This can be implemented in software or hardware for example.

In some embodiments the processor has a calculation part coupled to the counters and operable to sum the outputs of the counters in sequence to determine how many of the counters are summed to reach a predetermined proportion of the successful attach requests to determine a sample of the cumulative distribution. Again this can be implemented in software or hardware.

Some embodiments comprise all or part of a network including one or more base stations and the management system. In some embodiments, the management system is arranged to receive the compressed representation and to tune a capacity of a random access channel of the cell used for the attach requests from the user equipments according to a congestion level indicated by the compressed representation.

In some embodiments the network is an LTE network. In some such embodiments the delay values comprise a count of preambles repeated during the attach request. In such LTE networks for example, as part of a successful attach, the UE sends the counter numberOfPreamblesSent in the message UEInformationResponse.

The base station or eNodeB for each cell reads the numberOfPreamblesSent counter for each UE attach. The cell base station processes these counters to extract the important information, and shall send only this information to the management system.

A multitude of numberOfPreamblesSent counters may be processed to extract the useful information as follows:

For each successful attach, the eNB can read the counter numberOfPreamblesSent from the UE.

The eNB can keep a count of how many times each value of numberOfPreamblesSent has been received, to determine a distribution.

At the end of the measurement period, the eNB can calculate the cumulative distribution by an integration of the distribution, which effectively means determining how many requests were necessary to attain any level of probability of success. If the number of requests is determined for selected predefined probability levels of success, this is effectively a subsampling of the cumulative distribution. The results of this calculation are sent to the management system.

Another aspect provides a corresponding method of operating a base station for a cellular wireless network, having the steps of receiving attach requests at the base station from UEs, determining for each successful attach request a delay value representing a delay before the attach request was successful, determining a cumulative distribution of the delay values of different attach requests, generating a compressed representation of the cumulative distribution, and sending the compressed representation to a management system.

In some methods the delay values can comprise retry counts. These can comprise counts of unsuccessful attachment requests.

In some methods, the compressed representation can comprise a subsampled version of the cumulative distribution.

In some methods, the compressed representation can comprise a mean value and a variance value. In some cases this can be enough to provide a good approximation, and it can be tested to see if another representation such as a subsampled version of the cumulative distribution is needed.

In some methods, there is a further step of tuning a capacity of a random access channel of the cell used for the attach requests, according to a congestion level indicated by the compressed representation. In principle this can be carried out locally at the base station, or under the control of a management system.

Another aspect provides a corresponding computer program for controlling a base station for a cellular wireless network, the base station being arranged to receive attach requests from UEs, the program having instructions executable by a processor to cause the processor to carry out the steps of determining for each successful attach request a delay value representing a delay before the attach request was successful, determining a cumulative distribution of the delay values of different attach requests, generating a compressed representation of the cumulative distribution, and sending the compressed representation to a management system.

Any of the additional features can be combined together and combined with any of the aspects. Other effects and consequences will be apparent to those skilled in the art, especially over compared to other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which.

DETAILED DESCRIPTION

Figure 1:
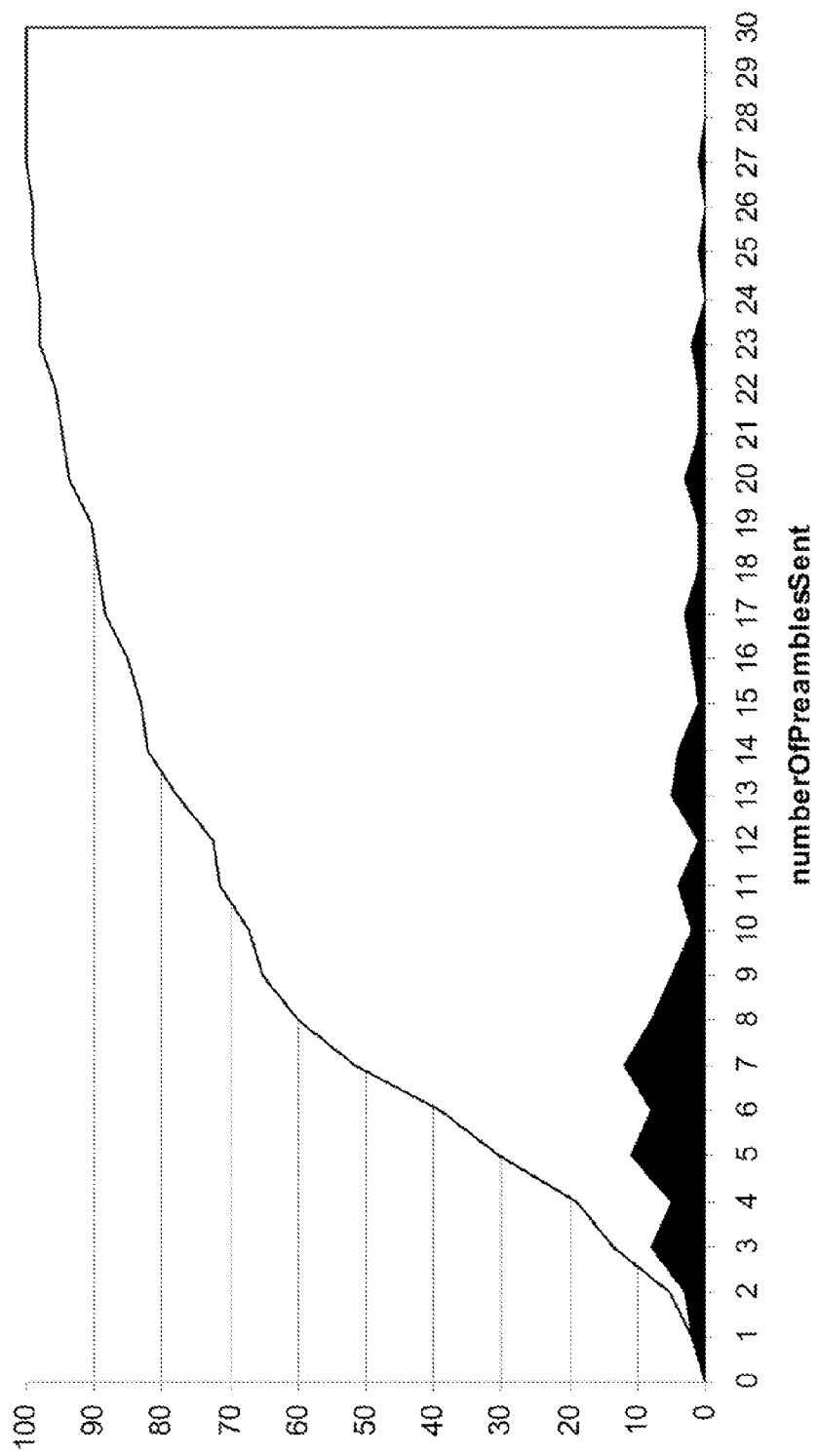
FIGS. 1 to 6 show graphs of numbers or preambles sent for various levels of performance.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

DEFINITIONS

Where the term "comprising" is used in the present description and claims, it does not exclude other elements or steps and should not be interpreted as being restricted to the means listed thereafter. Where an indefinite or definite article is used when referring to a singular noun e.g. "a" or "an", "the", this includes a plural of that noun unless something else is specifically stated.

Elements or parts of the described base stations, nodes or networks may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to nodes can encompass any kind of switching node, not limited to the types described, not limited to any level of integration, or size or bandwidth or bit rate and so on.

References to base stations are intended to encompass any kind of base station, not limited to those of any particular wireless protocol or frequency, and not limited to being located at a single location and so can encompass distributed base stations having functions at different locations or shared functions in a computing cloud shared between multiple base stations.

References to software can encompass any type of programs in any language executable directly or indirectly on processing hardware.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

References to attach requests can encompass any message or protocol over any kind of channel to indicate a mobile wireless device wishes to communicate via the base station, and encompassing, but not limited to the examples of sending a preamble from user equipment using a shared random access channel, or any other type of channel without time allocation, or any other type of channel without priority allocation.

References to delay values are intended to encompass any way of expressing a delay before the attach request succeeded, and encompassing but not limited to the examples of time duration, (measured or estimated, typically in milliseconds), or numbers of retries (where retries encompasses numbers of preambles sent).

References to cumulative distributions of delay values are intended to encompass any representation of such distributions, digital or analog, not limited to a particular level of precision, and where a digital representation can have any sample spacing, not necessarily related to the sample spacing of the delay values. References to compressed representations of the cumulative distribution are intended to encompass any kind of compression not limited to examples of subsamples taken at a spacing lower than a spacing of the different delay values, or an equation or equations representing lines showing a best fit to the samples of the cumulative distribution. The compressed representation can be generated as a separate step or can be generated integrally with the determination of the cumulative distribution.

Introduction

By way of introduction to the embodiments, how they address some issues with conventional designs will be explained.

It is proposed that the most important information should be extracted from the data. As far as the management system is concerned, the most important question to be answered is "What are the characteristics of this cell, in particular the attach delay characteristics?".

To illustrate how the characteristics of the cell can be extracted from the data, below are explained example graphs of the distribution of numberOfPreamblesSent for 3 cell types.

These example cell types are:

FIG. 1: A graph for a well-performing cell, where a majority of UEs gain access after a small number of attempts.

Figure 2:
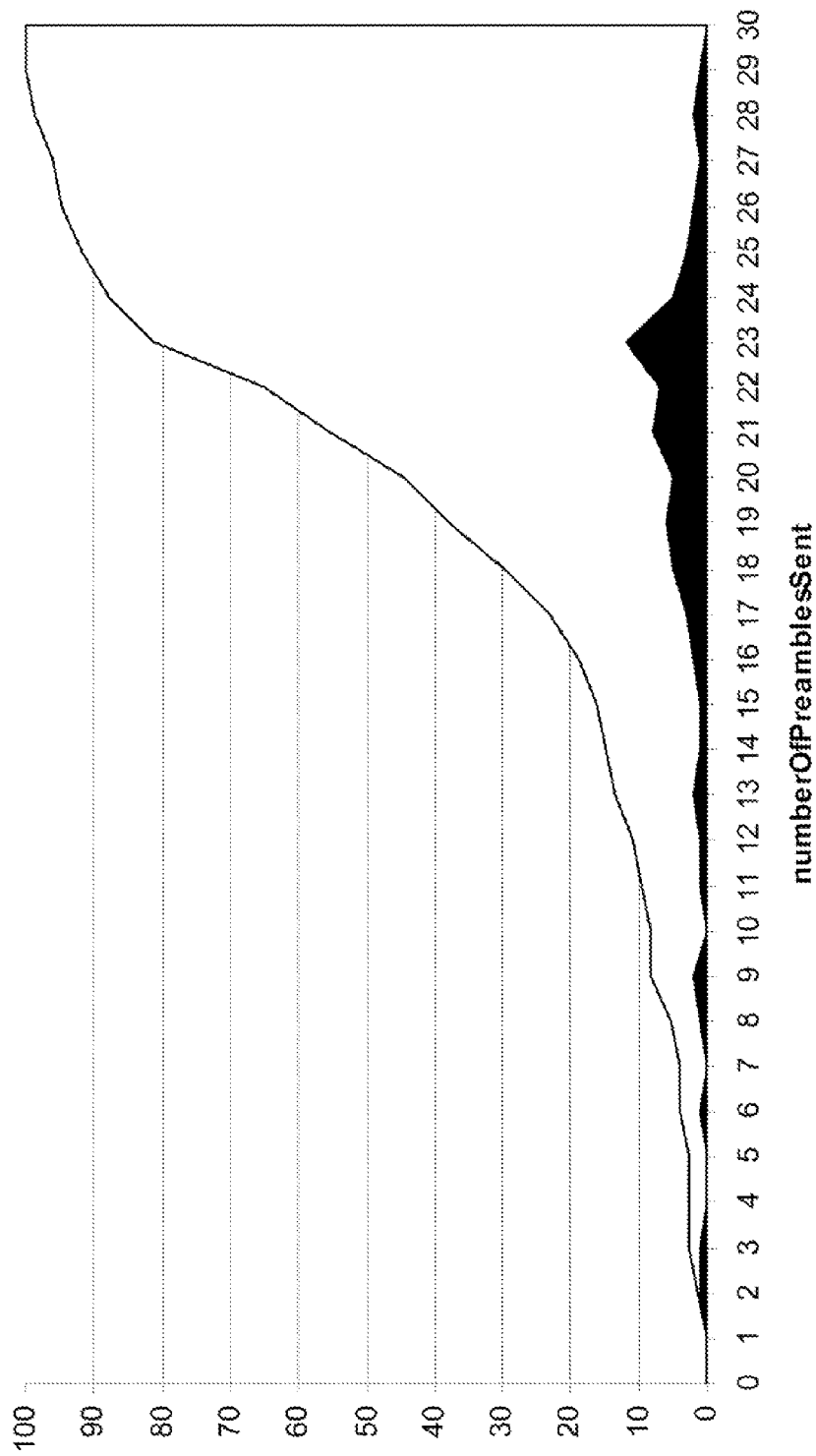

FIG. 2: A graph for a badly-performing cell, where a majority of UEs gain access after a large number of attempts.

Figure 3:
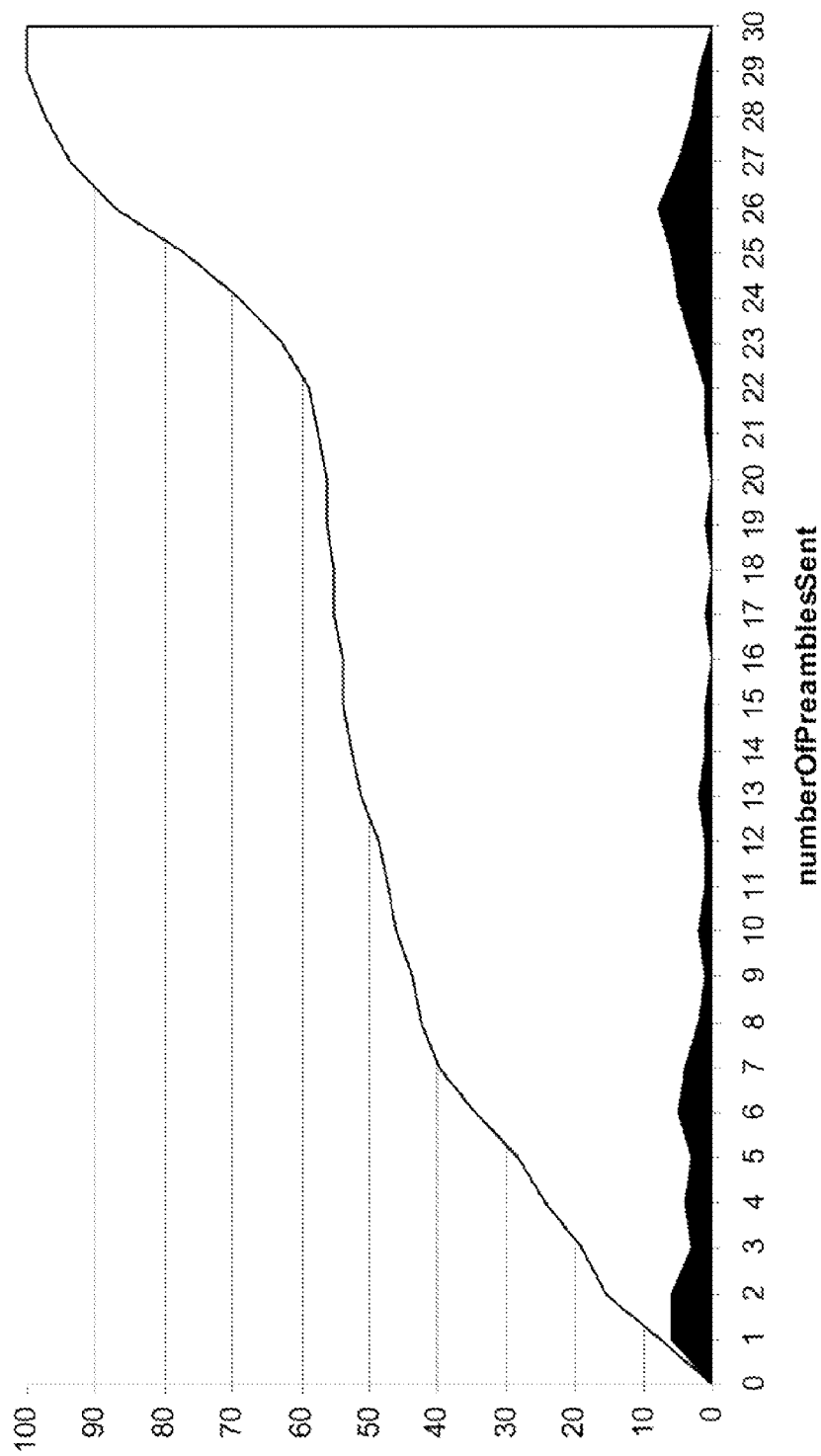

FIG. 3: A graph for a cell with bad experience for some users, where some UEs gain access after a small number of attempts, but a significant number of UEs gain access after a large number of attempts.

In these graphs, the data is shown as a distribution function (dark area) which shows the number of instances of each value of numberOfPreamblesSent. The data is also shown as a cumulative distribution function (top line) which shows the percentage probability of successful access after sending a number of preambles.

The characteristic of the cell is visible from the shape of the graph of the cumulative distribution, not from the individual data elements. Therefore, it is wasteful to send all the data elements to the management system. It would be sufficient to send just enough data to communicate the shape of the cumulative distribution graph to the management system.

To represent the distribution functions of the first two cells, shown in FIGS. 1 and 2, it would be sufficient to just send the mean and the variance of the distribution function. This would be enough to describe the characteristics of the cell. However, this would not be sufficient for the third type of cell. In the third type of cell, there are two peaks, one for the well-served users, and another for the badly-served users. A distribution function with multiple peaks cannot be represented by a mean and variance.

Therefore, it is proposed to encode enough data points to describe the shape of the cumulative distribution function. As an example, one possible solution is to encode 4 data points on the cumulative distribution function. Because the 2 end points can be assumed (0% success after 0 attempts, and 100% success after infinite attempts), this gives a total of 6 data points along the curve of the graph.

The eNB and the management system must share knowledge of some defined points on the Y-axis of the graph, in this case, 4 points must be agreed in advance. For the purposes of an example, it is proposed that the measurement should contain the 4 values of numberOfPreamblesSent which correspond to the following 4 values on the Y-axis . . . .

25%, 50%, 75%, 90%

Therefore, it is proposed that the following 4 gauge values should be sufficient to describe the characteristics of a cell regarding response to access attempts . . . .

Figure 4:
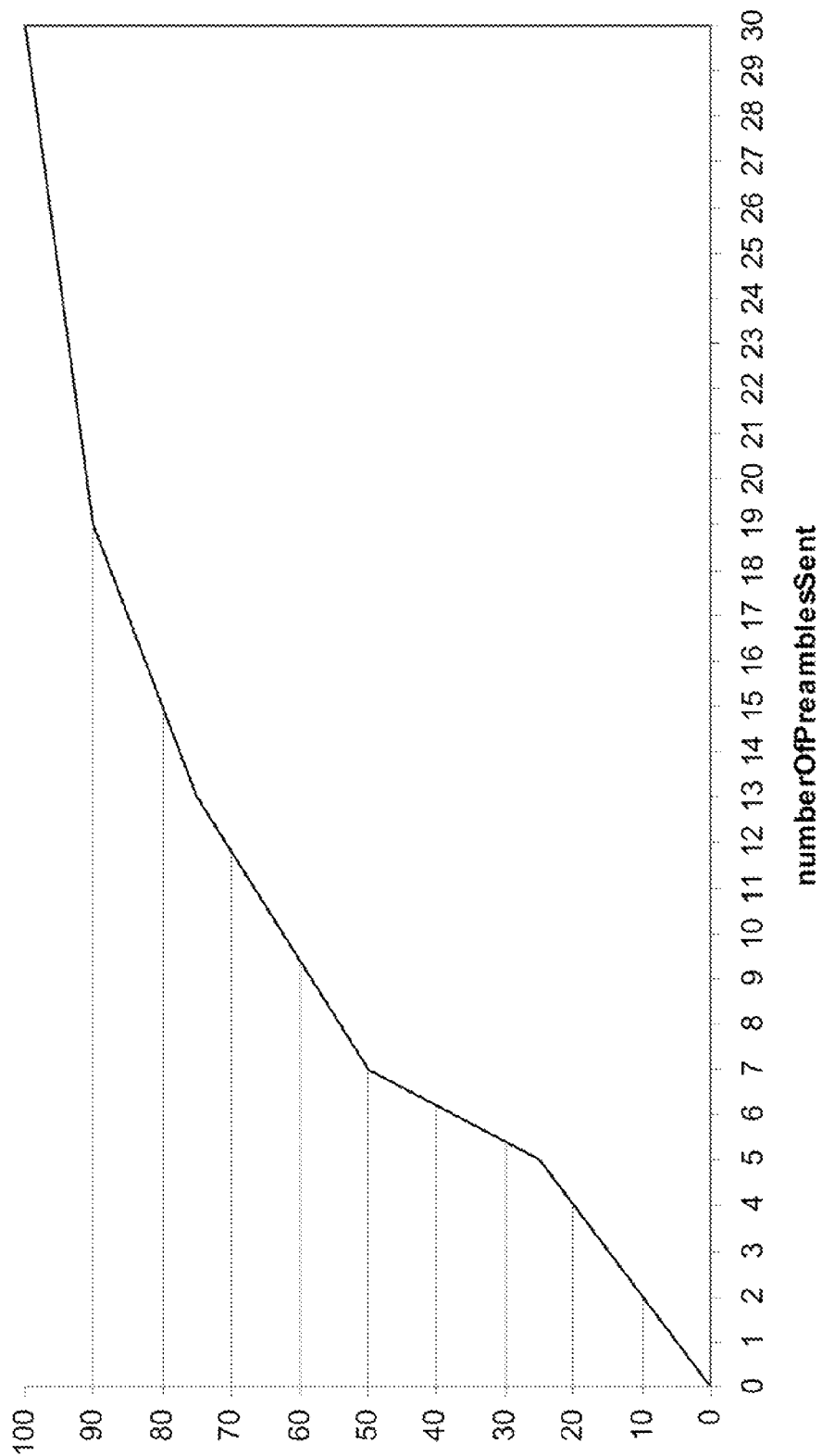
Figure 5:
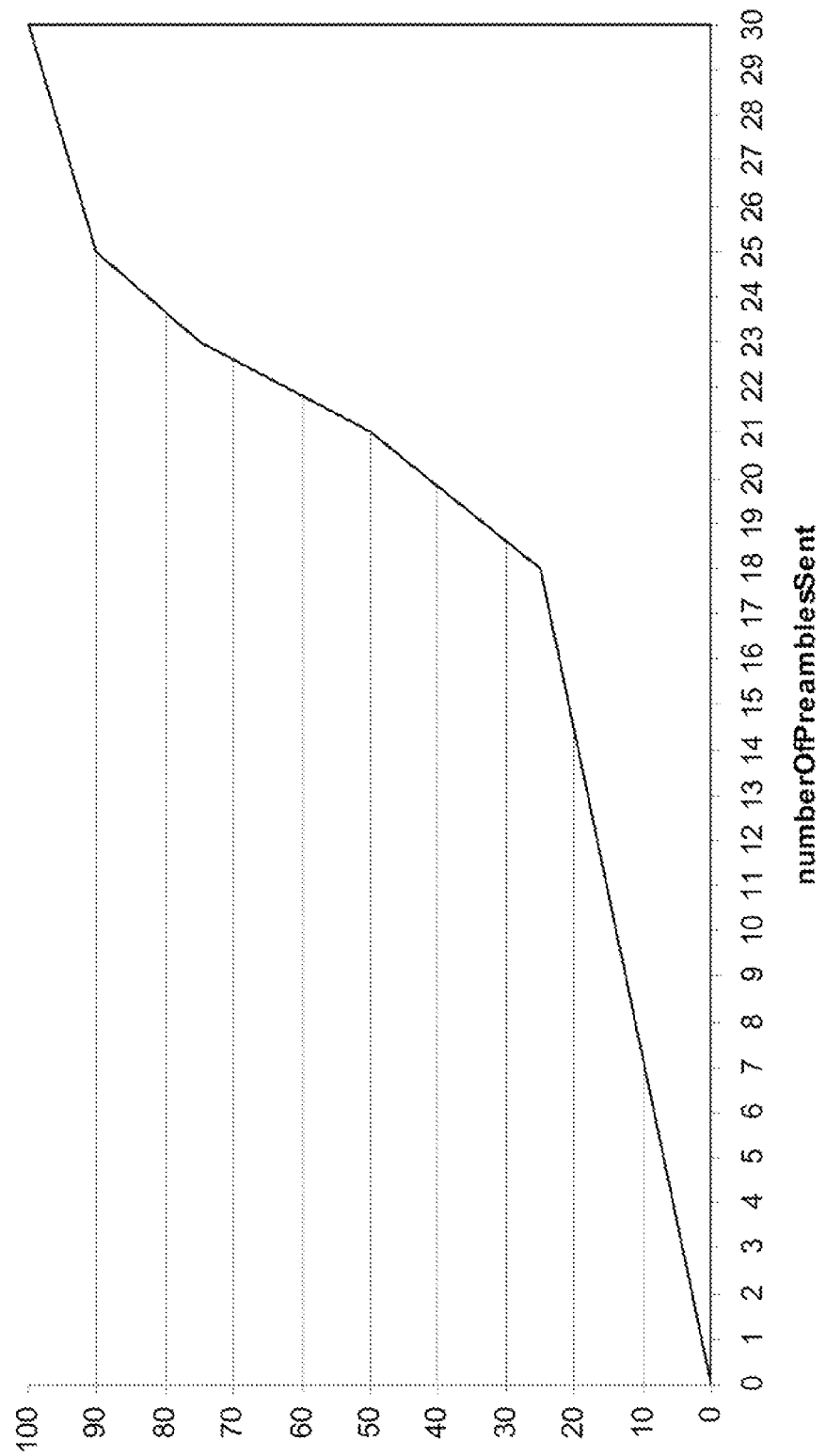
Figure 6:
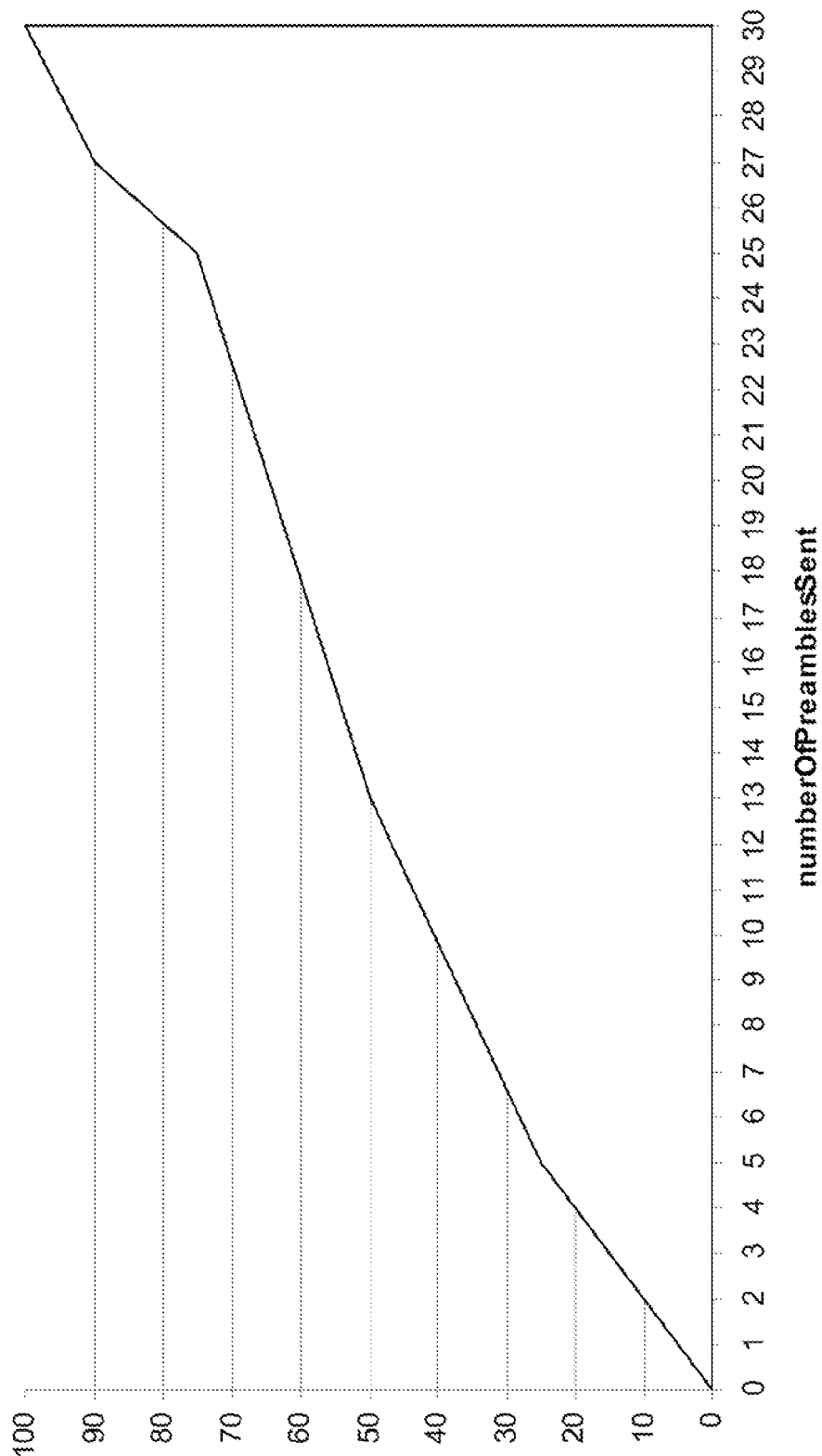

RachPreambleCount.25Perc
RachPreambleCount.50Perc
RachPreambleCount.75Perc
RachPreambleCount.90Perc To illustrate the outcome of this proposed method, FIGS. 4 to 6 show graphs of the compressed representation of the cumulative distributions of the 3 earlier examples of FIGS. 1 to 3, encoded with this scheme.

The selected values for FIG. 4 are as follows:
RachPreambleCount.25Perc=5
RachPreambleCount.50Perc=7
RachPreambleCount.75Perc=13
RachPreambleCount.90Perc=19

The selected values for FIG. 5 are:
RachPreambleCount.25Perc=18
RachPreambleCount.50Perc=21
RachPreambleCount.75Perc=23
RachPreambleCount.90Perc=25

The selected values for FIG. 6 are:
RachPreambleCount.25Perc=5
RachPreambleCount.50Perc=13
RachPreambleCount.75Perc=25
RachPreambleCount.90Perc=27

As can be seen from these graphs, enough information is encoded to allow the management system to construct a good approximation of the original cumulative distribution function.

Figure 7:
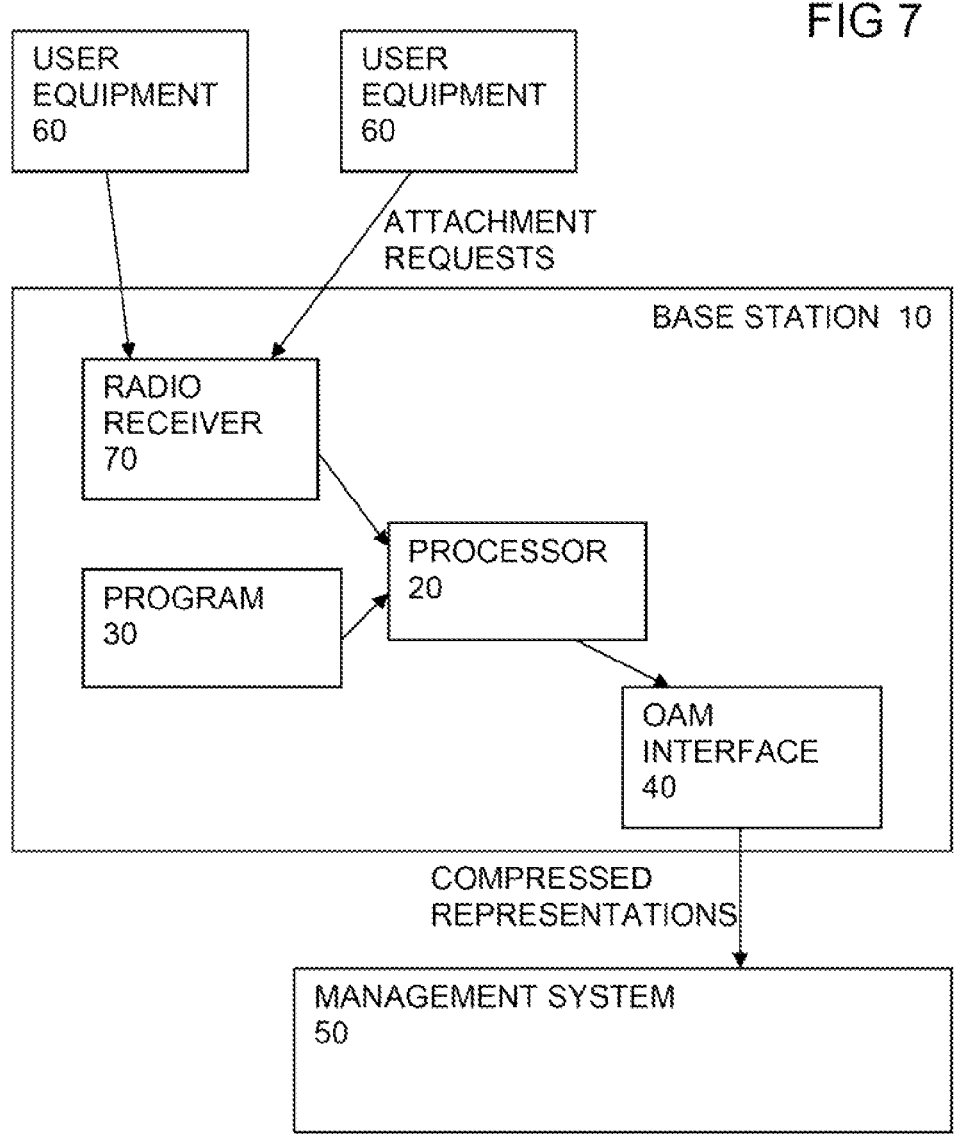
FIG. 7 shows a schematic view of an embodiment of a base station.
Figure 8:
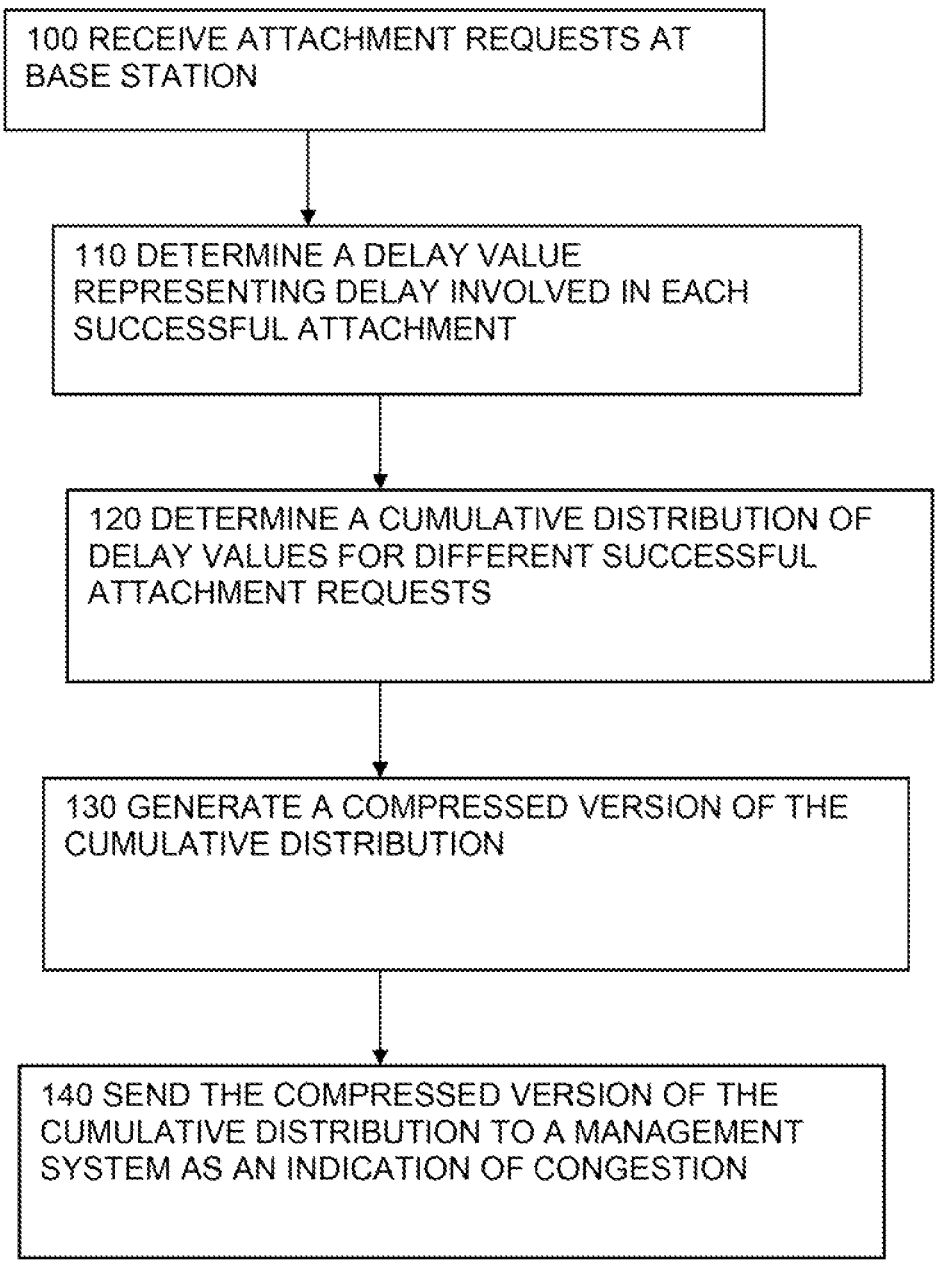
FIG. 8 shows steps of a method according to an embodiment.
Figure 9:
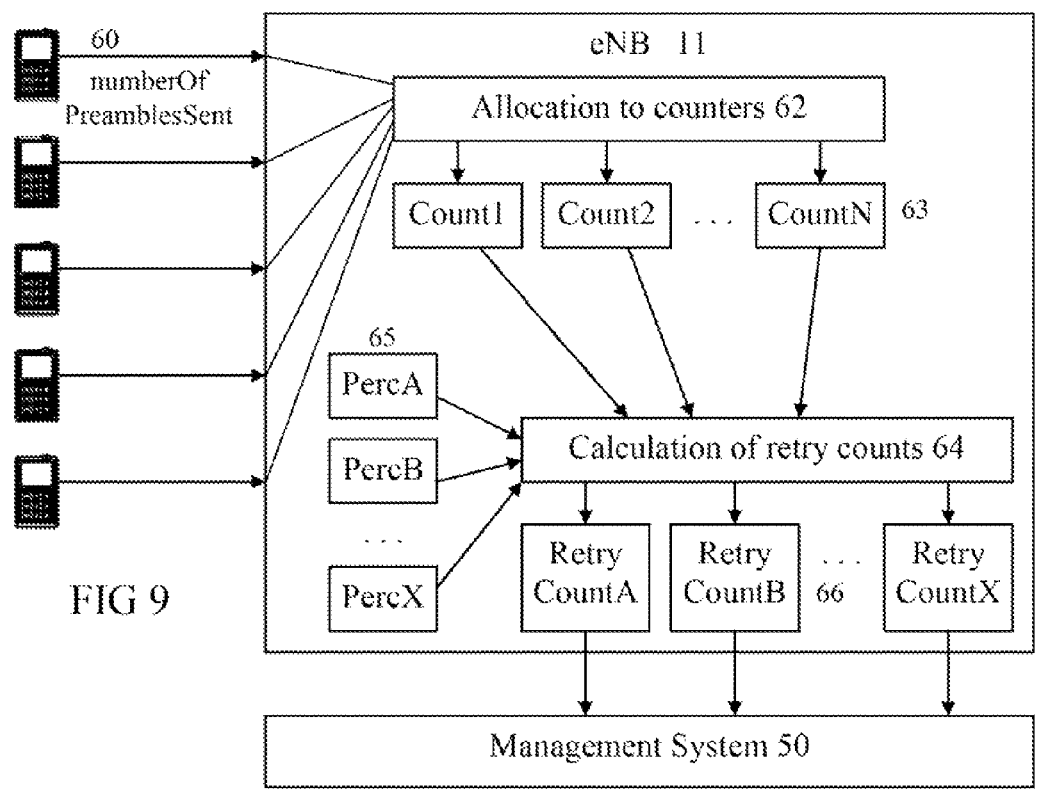
FIG. 9 shows a schematic view of another embodiment, having counters to generate a distribution of delay values in the form of preamble counts.

FIGS. 7 to 9

FIG. 7 shows a schematic representation of a base station 10 according to an embodiment, and having a radio receiver 70, a processor 20, a program 30 for the processor, and an OAM interface. The radio receiver is able to receive attachment requests from user equipment 60. The OAM interface is coupled to a management system 50. The program can be stored in non transitory form in any kind of computer readable storage, in any kind of computer language.

FIG. 8 shows some of the main operational steps which may be implemented as instructions in the program 30. At step 100 attachment requests are received via the radio receiver. At step 110 a delay value representing a delay involved in each successful attachment is determined. At step 120, a cumulative distribution of delay values is determined. These are delays for different successful attach requests. These can be from different User Equipments, or can include multiple attach requests from each of the User Equipments. Different attach requests are intended to refer to different instances, not to different types of requests. This does not exclude the possibility of the different instances sometimes including different types of attach requests such as ones for voice or for data or for a streaming service for example. A compressed version of this cumulative distribution is generated at step 130, which can then be sent to the management system at step 140.

FIG. 9 Examples of how to Determine the Compressed Representation.

FIG. 9 shows a schematic view of an embodiment, and shows a base station in the form of an eNB 11, a management system 50, and User Equipments 60 in the form of mobile phones. Some details are shown representing one possible way for the processor to be arranged to determine the compressed representation. The eNB receives attach requests and when a request is successful, the user equipment sends an indication of the delay in the form of a number of preambles sent by that user equipment for the same attach request before the attach request was successful.

The eNB has a function 62 for allocating each of these numbers to one of a series of counters 63 according to the size of the number. So if the number is 2, the second of the counters is incremented by one. This is an example of the processor having a number of counters each operable to accumulate a count of instances of different ones of the possible delay values to obtain a distribution of the delay values. The outputs of the counters represent the distribution. A calculation function 64 is provided in the eNB to determine a cumulative distribution and output a compressed representation of the cumulative distribution in the form of retry counts 66 at various sample points of the cumulative distribution, the sample points being set according to values 65 stored as percentages or obtained in any other way. This represents an example of the processor having a calculation part coupled to the counters and operable to sum the outputs of the counters in sequence to determine how many of the counters are summed to reach a predetermined proportion of the successful attach requests to determine a sample of the cumulative distribution. Other samples are found by determining how many of the counters are summed to reach another predetermined proportion of the successful attach requests.

These compressed representations in the form of retry counts can be sent to the management system 50, and used by the management system in various ways. These compressed representations can be used or stored or distributed much more efficiently than the original information in the form of huge quantities of numbers of preambles sent.

More details of this example of determining the compressed representations will now be described involving a number of steps as follows, with reference to features of FIG. 9:

1. One or more pre-defined percentage values PercA, PercB, PercC etc can be agreed in advance between the eNB and the management system. These values can be in the range 0 to 1 (0% to 100%).
2. For each cell, the eNB can contain a set of counters Count1, Count2 . . . CountX, where X is the maximum expected value of the counter numberOfPreamblesSent. At the beginning of each measurement period, these counters are reset to zero.
3. For each successful attach, the eNB can read the counter numberOfPreamblesSent from the UE. This is an example of a retry count representing a delay involved in the attachment. For each value received, the eNB can increment CountN, where N is the value contained in numberOfPreamblesSent. This is effectively creating a distribution of the retry counts.
4. At the end of the measurement period, the eNB can calculate the total number of successful attaches during the period by summing the contents of Count1 to Count N.
5. The eNB can sum the contents of Count1 and Count2, then add Count3, then add Count 4 and after each addition, test to see if the sum exceeds the total number of successful attaches multiplied by PercA. When it does exceed, then the current value of N (the number of counts summed) shall be assigned to RetryCountA. This is a sample of the cumulative distribution.
6. Step 5 can be repeated for PercB, PercC etc, by adding further counts and testing to see if the sum exceeds the total number of successful attaches, multiplied by the respective percentage, respectively creating RetryCountB, RetryCountC etc. These represent a sub-sampled version of the cumulative distribution, which is one way of generating a compressed version of the cumulative distribution. Even if only a handful of percentages are selected, the cumulative values at these percentages can approximate closely to the curve of the original cumulative distribution with little loss of information.
7. The eNB can report the values of RetryCountA, RetryCountB, RetryCountC etc to the management system. If needed, the management system can interpolate between these values.

More details of an example of how to implement these steps including pseudo code for a program for the processor now follows:

After a UE has attached to a cell, the eNB may request useful information from the UE by sending the UEInformationRequest message, and the UE replies with the UEInformationResponse message, refer to 3GPP TS 36.331 chapter 5.6.5. As part of the UEInformationResponse message, the UE returns the number of preambles which were sent to achieve connection, formally defined as numberOfPreamblesSent-r9 INTEGER (1..200)

refer to 3GPP TS 36.331 chapter 6.2.2 (UEInformationResponse message).

The management of RACH (Random Access CHannel) optimization is defined in 3GPP Shadow TS 32.522-V30.

One target is rachOptAccessProbability which contains

AP(25,n) 25% probability that the UE gets access within n number of attempts

AP(50,n) 50% probability that the UE gets access within n number of attempts

AP(75,n) 75% probability that the UE gets access within n number of attempts

AP(90,n) 90% probability that the UE gets access within n number of attempts

For example, setting AP(50,8) configures the RACH optimization algorithm so that a typical UE should have a 50% chance of attaching within eight attempts.

An actual algorithm is described below, split into the 4 phases of the algorithm, with reference to the seven steps set out above.

Algorithm, Start of Measurement Period (Step 2)

--- eNB resets variables Count[1], Count[2], ... Count[200]
eNB resets variable NumberOfAttaches

---

Algorithm, During Measurement Period (Steps 3 and 4)

---

For each UE connection
{
  eNB sends message UEInformationRequest to UE
  UE sends message UEInformationResponse to eNB
  eNB reads the value of numberOfPreamblesSent, assigns this value to variable N (step 3)
  eNB increments variable Count[N]
  eNB increments variable NumberOfAttaches
}

---

Algorithm, End of Measurement Period (Steps 5 and 6)

--- eNB sets variable Target = NumberOfAttaches * 25%
eNB sets variable Total=0
eNB sets variable N=0
loop
{
  eNB increments variable N
  eNB sets variable Total=Total+Count[N]
} while Total < Target
eNB sets variable RachPreambleCount.25Perc = N
eNB sets variable Target = NumberOfAttaches * 50%
eNB sets variable Total=0
eNB sets variable N=0
loop
{
  eNB increments variable N
  eNB sets variable Total=Total+Count[N]
} while Total < Target
eNB sets variable RachPreambleCount.50Perc = N
eNB sets variable Target = NumberOfAttaches * 75%
eNB sets variable Total=0
eNB sets variable N=0
loop
{
  eNB increments variable N
  eNB sets variable Total=Total+Count[N]
} while Total < Target
eNB sets variable RachPreambleCount.75Perc = N
eNB sets variable Target = NumberOfAttaches * 90%
eNB sets variable Total=0
eNB sets variable N=0
loop
{
  eNB increments variable N
  eNB sets variable Total=Total+Count[N]
} while Total < Target
eNB sets variable RachPreambleCount.90Perc = N

---

Algorithm (Step 7)

--- eNB sends variables
  RachPreambleCount.25Perc
  RachPreambleCount.50Perc
  RachPreambleCount.75Perc
  RachPreambleCount.90Perc
to the management system

---

Figure 10:
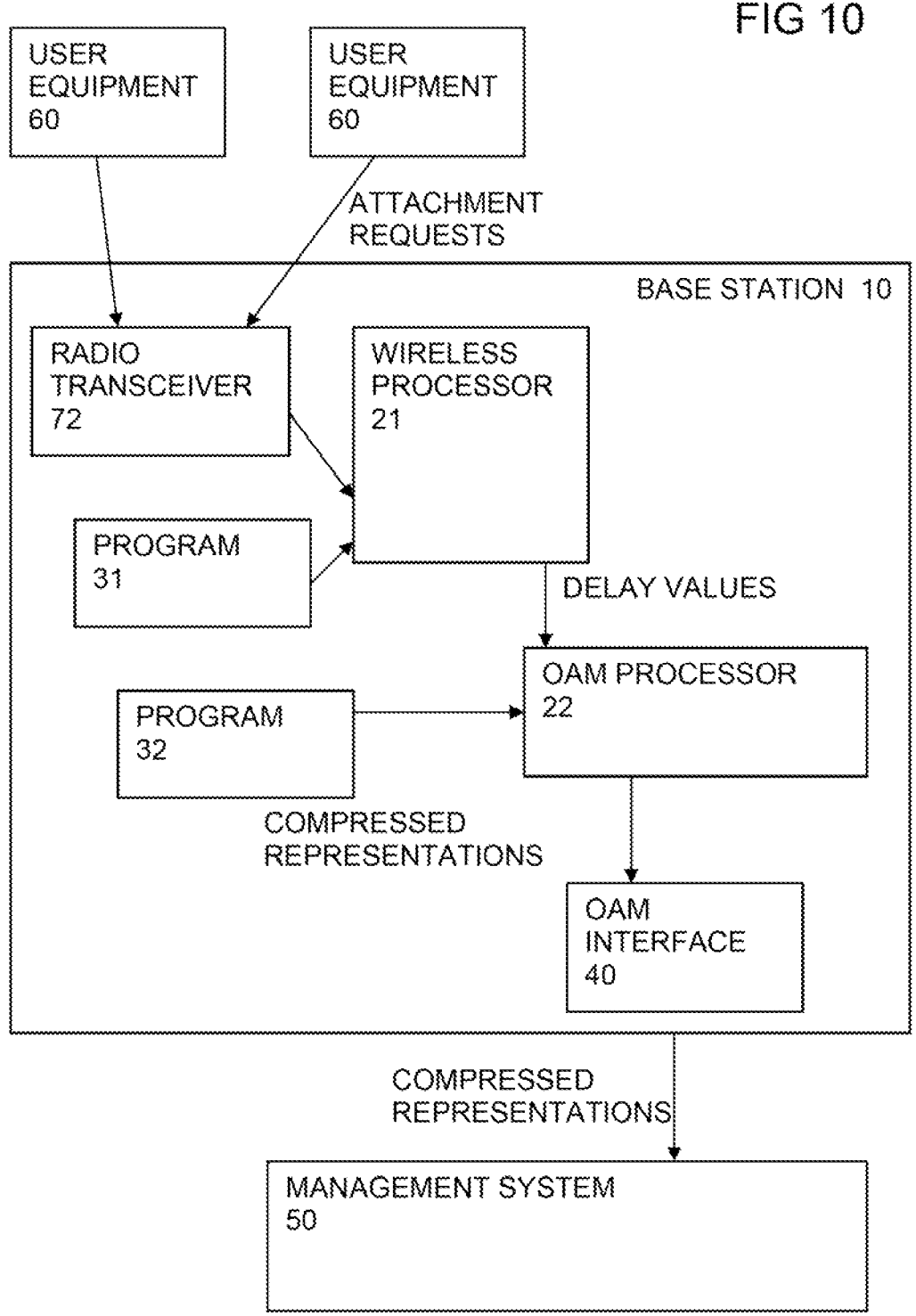
FIG. 10 shows a schematic view of another embodiment, having a multiple processor implementation.
Figure 11:
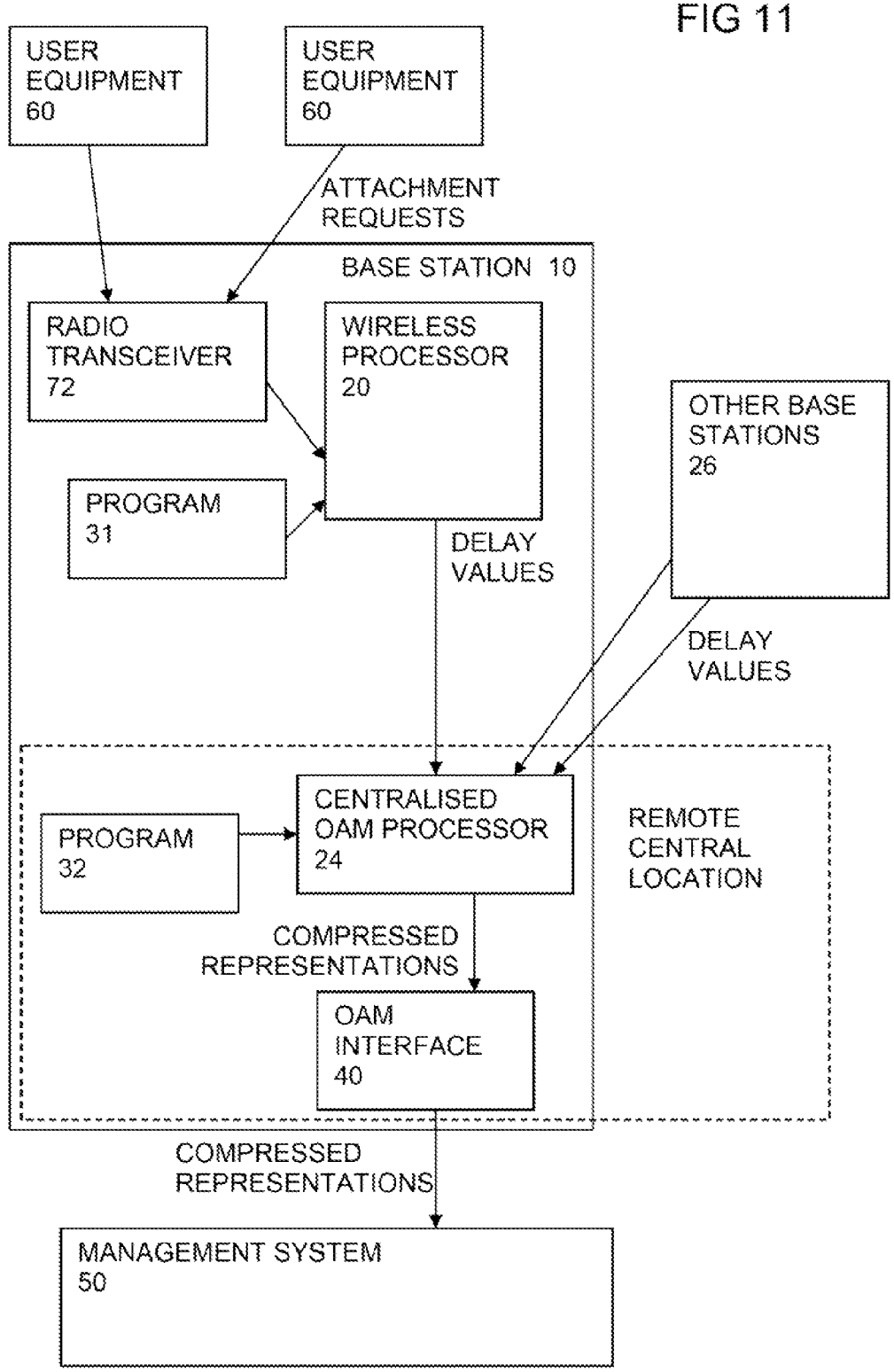
FIG. 11 shows a schematic view of another embodiment, having a base station distributed over different locations.

FIGS. 10, 11 example base station having multiple processors

FIG. 10 shows an example similar to that of FIG. 7, but having a wireless processor 21 and an OAM processor 22. A radio transceiver part 72 is coupled to the wireless processor, controlled by a program 31. Delay values are fed from the wireless processor to the OAM processor. The OAM processor is controlled by a program 32 and can output the compressed representations to the management interface in the form of the OAM interface 40. This is coupled to the management system 50.

FIG. 11 shows another embodiment similar to that of FIG. 10 but having a centralized OAM processor 24 in place of OAM processor 22. This is located at a remote central location, and thus can serve other base stations 26. These other base stations can feed in their delay values and the compressed representations produced by the centralized OAM processor can relate to multiple base stations. This means the base station 10 may be distributed across different locations, with parts coupled by communications links.

Figure 12:
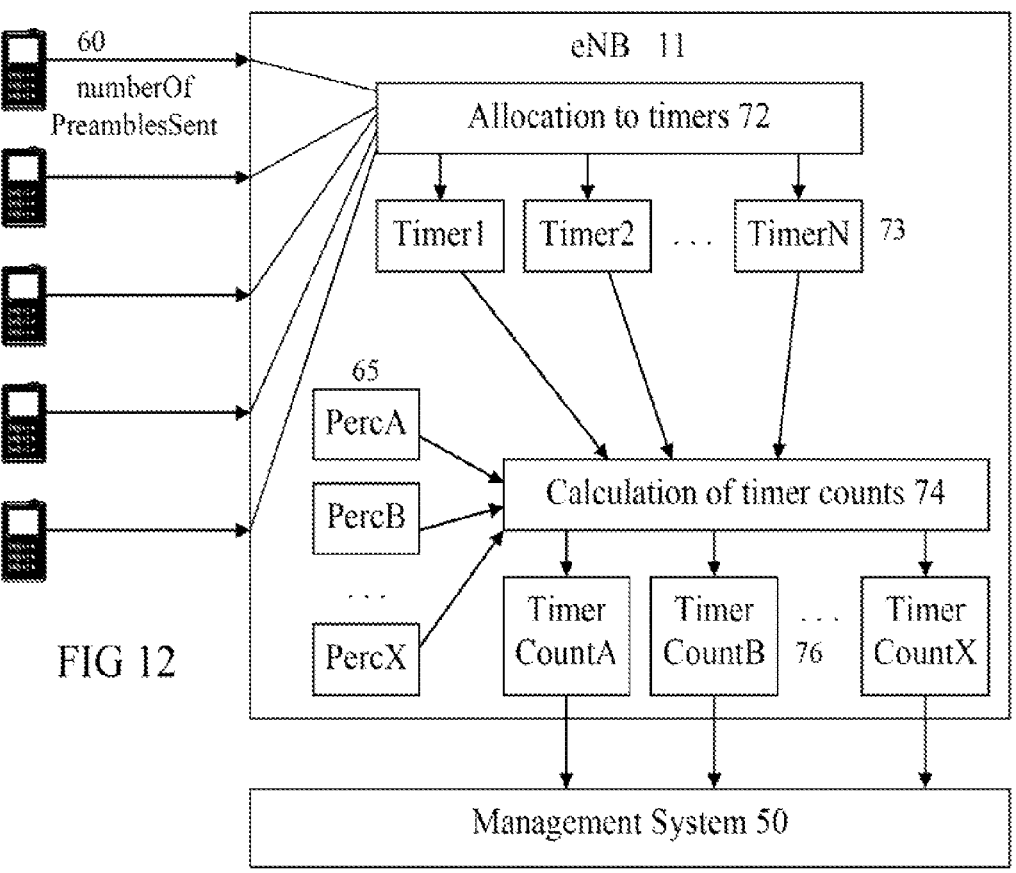
FIG. 12 shows a schematic view of another embodiment using times as delay values.

FIG. 12, Embodiment Using Delay Times

FIG. 12 shows another embodiment similar to the embodiment of FIG. 9, but using delay values in the sense of delay times rather than retry counts. An allocation function 72 determines or estimates the delay time based on the number of preambles sent, and optionally based on other factors. The times are allocated to timer counters 73, which are incremented in a similar fashion to the counters of FIG. 8.

So if the time delay value is 2, the second of the counters is incremented by one. The outputs of the counters represent a distribution of the delay values. A calculation function 74 is provided in the eNB to determine a cumulative distribution and output a compressed representation of the cumulative distribution in the form of timer counts 76 at various sample points of the cumulative distribution, the sample points being set according to values 65 stored as percentages (PercA, PercB, . . . PercX) or obtained in any other way. These timer counts can be sent to the management system 50, and used by the management system in various ways.

As has been presented above, a base station has a wireless interface, a processor and a management interface. The processor determines a delay before an attach request was successful, the processor also being arranged to determine a cumulative distribution of the delay values of different attach requests, and a compressed representation of the cumulative distribution. The management interface is used to send the compressed representation to a management system. The cumulative distribution is simpler, having no change in a sign of its gradient, and so can be approximated and represented in compressed form with much less risk of loss of relevant information. Other variations and embodiments can be envisaged within the claims.

The invention claimed is:

1. A base station for a cellular wireless network having:
   a wireless interface,
   a processor, and
   a management interface for communication with a management system,
   the wireless interface being arranged to receive attach requests from User Equipments, the processor being coupled to the wireless interface and being arranged to determine for each successful attach request a delay value representing a delay before the attach request was successful,
   the processor also being arranged to determine a cumulative distribution of the delay values of different attach requests, and to generate a compressed representation of the cumulative distribution, and
   the processor being coupled to the management interface to send the compressed representation to the management system.

2. The base station of claim 1, the processor being arranged to determine the delay values in the form of retry counts.

3. The base station of claim 2, the retry counts comprising counts of unsuccessful attach requests.

4. The base station of claim 1, the delay values comprising a time interval from starting the attach request until the attach request was successful.

5. The base station of claim 1, the management interface comprising an Operation And Maintenance (OAM) interface for communication with the management system.

6. The base station of claim 1, the compressed representation comprising a sub-sampled version of the cumulative distribution.

7. The base station of claim 1, the compressed representation comprising a mean value and a variance value.

8. The base station of claim 1 and the processor having a number of counters each operable to accumulate a count of instances of different ones of the possible delay values to obtain a distribution of the delay values.

9. The base station of claim 8, the processor having a calculation part coupled to the counters and operable to sum the outputs of the counters in sequence to determine how many of the counters are summed to reach a predetermined proportion of the successful attach requests to determine a sample of the cumulative distribution.

10. A wireless network comprising a base station, the wireless network comprising:
a wireless interface,
a processor,
a management interface for communication with a management system, the wireless interface being arranged to receive attach requests from User Equipments, the processor being coupled to the wireless interface and being arranged to determine for each successful attach request a delay value representing a delay before the attach request was successful,
the processor being arranged to determine a cumulative distribution of the delay values of different attach requests, and to generate a compressed representation of the cumulative distribution, and
the processor being coupled to the management interface to send the compressed representation to the management system.

11. The network of claim 10, the management system being arranged to tune a capacity of a random access channel used for the attach requests by the user equipments according to a congestion level indicated by the compressed representation.

12. The network of claim 10, comprising an LTE network, and the delay values comprising a count of preambles repeated during the attach request.

13. A method of operating a base station for a cellular wireless network, the method comprising the steps of:
receiving attach requests at the base station from User Equipments,
determining for each successful attach request a delay value representing a delay before the attach request was successful,
determining a cumulative distribution of the delay values of different attach requests,
generating a compressed representation of the cumulative distribution, and
sending the compressed representation to a management system.

14. The method of claim 13, the delay values comprising retry counts.

15. The method of claim 14, the retry counts comprising counts of unsuccessful attach requests.

16. The method of claim 13, the delay values comprising a time interval from starting the attach request until the attach request is successful.

17. The method of claim 13, the step of generating the compressed representation comprising generating a sub-sampled version of the cumulative distribution.

18. The method of claim 13 and having the step of accumulating a count of instances of different ones of the possible delay values to obtain a distribution of the delay values.

19. The method of claim 18, having the step of summing the counts of instances in sequence to determine how many of the counts of instances are summed to reach a predetermined proportion of the successful attach requests to determine a sample of the cumulative distribution.

20. The method of claim 13, the step of generating the compressed representation comprising generating a mean value and a variance value of the cumulative distribution.

21. The method of claim 13, having the further step of tuning a capacity of a random access channel used for the attach requests by the user equipments according to a congestion level indicated by the compressed representation.

* * * * *